Oct. 12, 1965 R. J. FAY ETAL 3,210,823
ARCHITECTURAL PRODUCT AND MANUFACTURE THEREOF
Filed Nov. 28, 1960 3 Sheets-Sheet 1
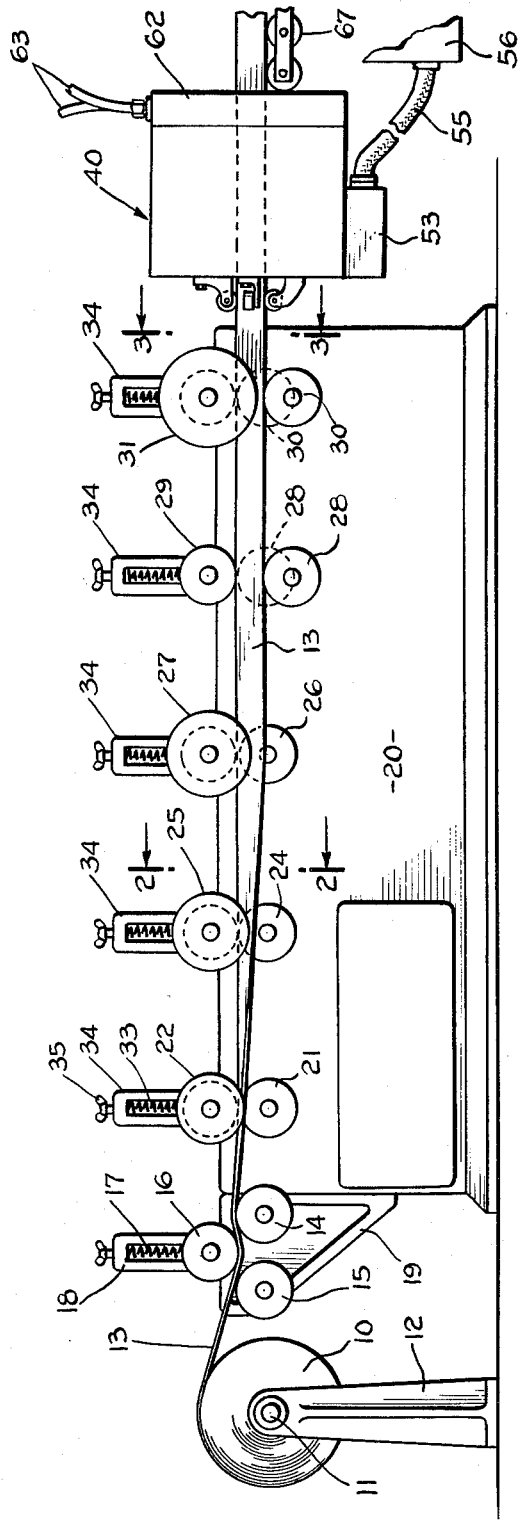
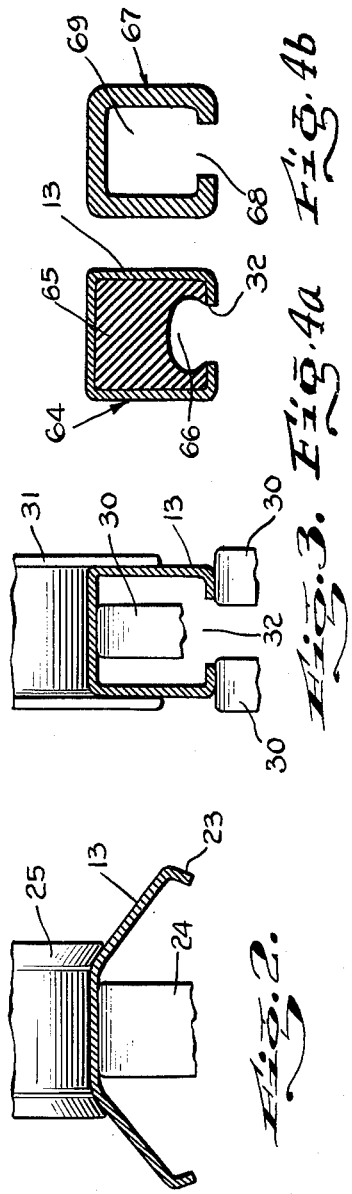
INVENTOR.
ROBERT J. FAY
GEORGE MATHEWS
BY HENRY S. ROSE
R.E. Geaugue
ATTORNEYS

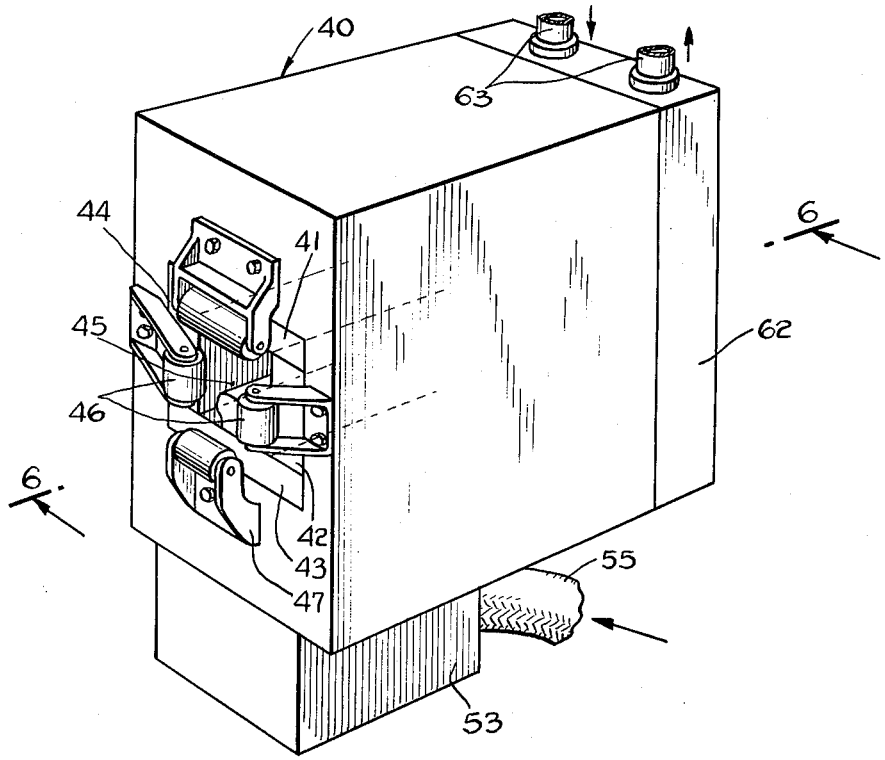
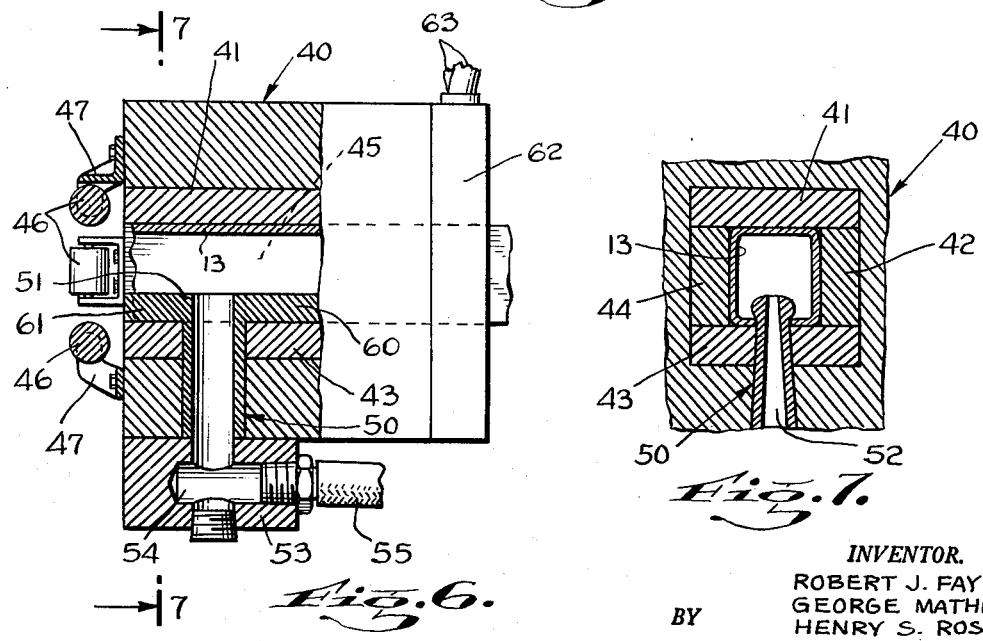

INVENTOR.
ROBERT J. FAY
GEORGE MATHEWS
HENRY S. ROSE
BY R. E. Geaugue
ATTORNEYS

United States Patent Office 3,210,823
Patented Oct. 12, 1965

3,210,823
ARCHITECTURAL PRODUCT AND
MANUFACTURE THEREOF
Robert J. Fay, 1377 Inverness, Pasadena, Calif.; George Mathews, 428 S. Orchard Drive, Burbank, Calif.; and Henry S. Rose, 816 Glenmere Way, Los Angeles, Calif.
Filed Nov. 28, 1960, Ser. No. 72,237
9 Claims. (Cl. 29—33)

This invention relates to an architectural product and manufacture thereof, and more particularly to a thin walled, rolled metal strip containing foamed polyurethane and to the method and apparatus for producing same.

It has been proposed to utilize foamed, closed-cell polyurethane as insulation material, as packaging material, and as a component in laminated structures. For insulation purposes, Du Pont produces a rigid urethane foam blown with Freon. Structural uses, and urethane foam therefor, are disclosed in Belgian Patent 519,547. Conventional polyurethane foam is produced by the action of carbon dioxide gas generated by the reaction between water and free isocyanate. However, various other reactive and non-reactive additives and blowing agents have been utilized to produce polyurethane foam having various desired properties. Examples of these foams are disclosed in U.S. Patents 2,591,884; 2,602,783; 2,642,403; 2,772,245; 2,802,795; 2,698,738 and 2,948,698. Polyurethane foams have great strength and will adhere firmly to metal containers in which they are foamed. The present invention can utilize any foam composition of the prior art which can be continuously discharged into a thin, rolled metal structure and foamed as the structure moves along a production line. The substance to be foamed can be discharged through a nozzle as taught in French Patent No. 1,161,239 dated March 17, 1958 and will foam to fill the moving metal structure.

In particular, the invention relates to architectural members usable with sliding windows, store fronts, curtain walls and similar structures, which utilize large glass areas or other large panels which must be supported at their edges. At the present time, the glass or other panels are confined by member strips extruded from aluminum. The extrusion process has been utilized since the extrusion dies perform most of the required forming of the material and the material can be made thick enough to have this necessary rigidity. Also, by producing the members of aluminum, the property of rust resistance is available. While the strength of these confining edge strips need not be high, it is necessary that the strip members have sufficient rigidity to serve as confining members and to resist wear and other damage. If the thickness of present aluminum extrusions is reduced, then the rigidity is not sufficient.

By the present invention, a thin walled strip member can be produced from a metal sheet much thinner than permissible minimum extrusion thicknesses. Rigidity can be imparted to this thin rolled metal member by placing within the interior thereof a polyurethane foam which adheres to the metal structure. In other words, the thickness of aluminum metal utilized by the present invention can be about one-fourth of the permissible minimum extrusion thickness, and after filling the metal strip with polyurethane foam, the total structure is about one-third the weight of minimum extrusions now in use. It has been determined that .015 inch aluminum sheet is about as thin as can be satisfactorily rolled and members rolled of this material and filled with polyurethane foam are equivalent in rigidity and necessary strength to the minimum extruded members formed from .062 inch aluminum. Also, because of the use of the polyurethane foam, the strips of the present invention have good insulating qualities and can be utilized in structures which meet fire wall requirements. While the product and manufacture are primarily related to aluminum, it is understood that thin sheet stainless steel can also be utilized in the invention.

The process and equipment for producing the structural product comprises a roll forming device which receives flat, thin aluminum sheets and progressively rolls it into the desired shape of the architectural member. As the thin rolled member leaves the last roller set, it enters a foaming die having an interior opening of the same shape as the exterior of the member. The foaming die contains a foaming nozzle which injects the material to be foamed into the interior of the shaped member as it moves through the die and by the time the member leaves the die, the interior space in the member has been foamed around the injection nozzle. Because the die can be located closely to the last rolling operation, sufficient rigidity exists in the member to guide and push the material through the die. Therefore, no separate handling of the thin, rolled metal is required, prior to filling with the foam, which could result in damage to the member and excessive handling costs. When the structures produced by this invention are used as fire walls, they have structural integrity to 285° F. and heat induction will not raise the temperature to 200° F. which is a requirement for fire walls. The aluminum sheets will be cut to length prior to entering the roll forming operation and can be colored or otherwise decorated, either before or after the foaming operation. While the invention is primarily related to architectural structures, the product can be utilized in other fields such as automobiles, aircraft, furniture and other structures.

It is therefore an object of the present invention to provide an architectural member fabricated from a thin sheet of metal which has been rolled into shape and then at least partially filled with a polyurethane foam in a continuous process.

Another object of the present invention is to provide a process for producing a structural product having an outer skin of thin, rolled metal filled with a polyurethane foam, said process including the progressive rolling of the thin sheet into shape and continuously feeding the sheet through a foaming die containing a nozzle for injecting the foam material into the interior of the formed sheet.

A further object of the present invention is to provide a foaming die which has replaceable die parts shaped to the exterior contours of the finished strip and which includes a nozzle for continuously inserting within the rolled strip the foaming material as the strip is driven through the die by the force from the roll forming operation.

Another object of the invention is to provide a structural member for use as framing around windows, glass doors, wall panels, and the like, and which provides a substantial saving in manufacturing cost and weight over present aluminum extrusion having comparable rigidity and strength.

These and other objects of the invention not specifically set forth above will become readily apparent from the accompanying description and drawings in which:

FIGURE 1 is a side elevational view of the apparatus for producing the novel product of the present invention, FIGURE 2 is a sectional view along lines 2—2 of FIGURE 1 showing the shape of the metal sheet at an intermediate stage in the rolling operation, FIGURE 3 is a sectional view along lines 3—3 of FIGURE 1 showing the final shape of the rolled metal sheet, FIGURE 4A is a cross section of the final strip member as it leaves the die head filled with polyurethane foam, FIGURE 4B is a cross section of an extruded member having a thickness required to give rigidity comparable to the structure of FIGURE 4A.

FIGURE 5 is a perspective view of the die head of the present invention in which the rolled metal skin receives the foam, FIGURE 6 is a section, partly in elevation, along line 6—6 of FIGURE 5 showing the nozzle for injecting the foam material into the die.

FIGURE 7 is a transverse section along line 7—7 of FIGURE 6 showing the nozzle,

Figure 8:
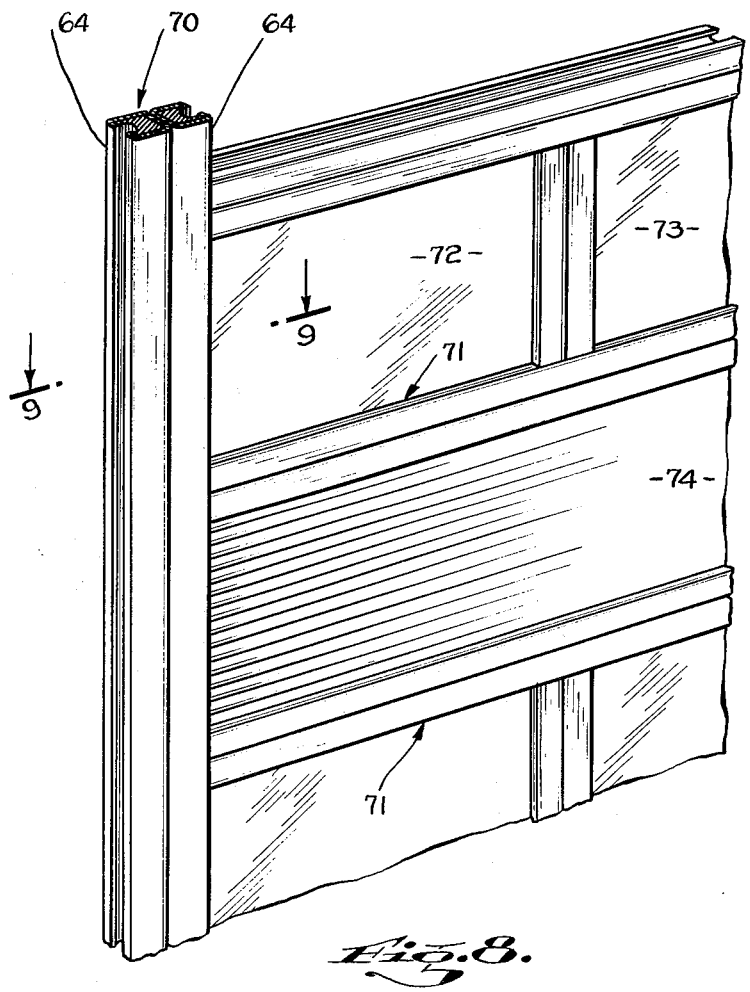
FIGURE 8 is a perspective view of a wall construction including a plurality of the sections formed by the product of the invention.

Referring to FIGURE 1, a roll 10 of thin aluminum sheet is supported on shaft 11 carried by frame 12. A single sheet 13 leaves the roll 10 and passes through three straightening rollers comprising two lower rollers 14 and 15 and an upper roller 16. The upper roller is biased downwardly by an adjustable spring 17 held within a frame 18 in a well-known manner. All three rollers 14, 15, and 16, are mounted on a frame 19 located adjacent the bed 20 for the forming rollers. The layer 13 first enters the pair of rollers 21 and 22 which put the intial bend in the layer 13. The second pair of rollers 24 and 25 make an additional bend 23 in the layer 13 as illustrated in FIGURE 2. The third set of rollers 26 and 27 continue to bend the layer 13 and the fourth roller set consists of three lower rollers 28 and a single upper roller 29. The final stage consists of three lower rollers 30 and the single upper roller 31 as illustrated in FIGURE 3, and the form of the layer 13 is substantially rectangular with a slit 32 extending along its length. All of the top rollers in bed 20 are biased towards the lower rollers by a spring 33 contained in a frame 34 and adjustable by a nut 35. It is understood that the shape in which the thin metal layer 13 is rolled can be varied by changing the shape and number of the rollers.

A foaming die 40 is located adjacent the end of bed 20 adjacent the last set of rollers and the die contains four replaceable die sections 41, 42, 43 and 44 which define an internal rectangle shape cavity 45 within the die conforming to the outside contour of the strip 13 as it leaves the last set of rollers. A guide roller 46 is located exteriorly of each die section and is supported on a frame 47 attached to the front of the die. The rollers 46 serve to guide the sheet 13 into the opening between the die sections in the event that the leading edge of the sheet is not in alignment with the opening 45 within the die. An elongated nozzle 50 extends through the foaming die 40 and the die element 43 into the lower part of opening 45. The discharge end 51 of the nozzle is located in the slit 32 as the strip 13 passes through the die.

The passage 52 in nozzle 50 connects with a distributing block 53 secured to the bottom of the foaming die 40 and the block has an opening 54 for connecting dicharge opening 52 with a passage 55. The passage 55 leads to a container 56 containing material which foams to produce the polyurethane foam when introduced to the interior of the die through the nozzle discharge end 51. It is understood that the material line 55 can be placed under necessary pressure by any suitable pumping system or pressure in the tank 56 and that the tank 56 will contain suitable compositions to produce the urethane foam of selected properties within the interior of the strip 13. A solid member 60 in the shape of the nozzle end 51 extends rearward to the aft end of the forming die 40 and a solid member 61 in the shape of the nozzle end 51 extends forwardly to the front end of the die member. Thus, the end 51 and the members 60 and 61 form a continuous male form along the length of slit 32 within the foaming die, around which the polyurethane foam can form during the continuous passage of the strip 13 through the die 40.

The length of the foaming die 40 will therefore depend upon the foaming rate of the polyurethane introduced through the nozzle end 51 and it is desired to have the strip 13 completely filled with foam by the time the strip leaves the end of the die. If necessary, a heating jacket 62 can be located at the exit end of the die and supplied with fluid by supply and return lines 63. It is also understood that the selection of the foaming material will be one which will not be affected by the increased temperature of the sheet 13 entering the foaming die and caused by the rolling operation.

As illustrated in FIGURE 4A, the completed member 64 leaving the foaming die 40 has its interior filled with foamed polyurethane 65 and the opening 66 results from the presence of the members 60 and 61 and the nozzle head 51 extending through the slit 32 along the length of the die. The completed member is received by rollers 67 of a conveyer located adjacent the foaming die in order to convey the member away from the die. In FIGURE 4B, an extruded aluminum member 67 of the prior art has a slot 68 corresponding to the slot 32 in the member 64 of the present invention. The slots 32 and 68 are for the purpose of receiving the edge of a glass or metal panel and a vinyl seal is squeezed between the panel and the edges of the slot in order to hold the member 64 or 67 to the edge of the panel. The cavity 66 of the member 64 will receive the vinyl sealing material and the sealing material will extrude past the edges forming slit 32 in order to hold the glass.

The member 67 is formed as a .062 inch aluminum extrusion whereas the member 64 is formed from an aluminum panel 13 of only .015 inch in thickness. By filling the member 64 with the polyurethane foam, the member 64 is superior in rigidity and torsion to the member 67 while weighing only one-third as much. It is obvious that the difference in weight is because the thickness of aluminum in the member 64 is only one-fourth of the thickness of the member 67. While it is possible that the panel 13 from which the member 64 is formed could be reduced to .010 inch, such a small thickness is hard to handle in fabrication operations. Also, the .015 inch thickness is enough to withstand the weather elements and give a protective coating for the polyurethane foam over long periods of time. In the case of structures, such as a curtain wall, where the member 67 would be fabricated of .125 inch extruded aluminum the member 64 could be constructed of .060 aluminum sheeting to obtain at least equal structural rigidity and torsion resisting capability. It is understood that a stainless steel sheet could be also utilized and that various shapes of member 64 can be rolled and thereafter filled with the polyurethane foam.

It is apparent that member 67 cannot be utilized in a fire wall structure since it would conduct heat from one side to the other of the wall, making the temperature of the wall too high on the other side. It is generally required that a fire wall not exceed a temperature of 200° on the opposite side. Because of the high heat conduction properties of the extruded aluminum, the member 67 cannot meet this requirement. On the other hand, the member 64 contains the foam 65 which acts as an insulating material and prevents the transfer of heat or cold from one side of the wall to the other so that this structure can be utilized to meet the requirement of a fire wall.

Figure 9:
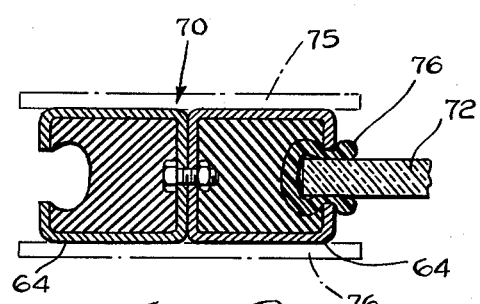
FIGURE 9 shows a strip member comprised of two strip sections secured together to form a mullion between adjacent rooms.

Referring to FIGURE 8, there is shown a wall construction which utilizes a pair of the members 64 in back-to-back relationship to form a mullion 70 which extends one or more floors in height. Similar members 71 extend horizontally the width of the rooms. Glass panels 72 and 73 and metal panels 74 are received by the members 70 and 71. For each floor of the building, the lower half is covered by an aluminum panel 74 and the upper part contains panels 72 and 73. The only structural strength required by the members 70 and 71 is to hold the glass and metal panels in place. These members can be covered by face panels 75 and 76 and can be tied to the large structural members of the building through these face panels. In FIGURE 9, the vinyl sealing material 76 is shown retaining the glass panel 72 within a member 64 which forms a portion of the mullion 70.

In the present invention there is provided a novel architectural product which can be roll formed into various shapes to provide an outer skin of thin metal and can thereafter be filled in a continuous process with polyurethane foam which strongly adheres to the metal and provides strength and insulating qualities. The structures are particularly suited for the edges of doors, windows, store fronts and curtain walls and are cheaper and stronger than structures presently in use. The continuous forming process made possible by the combination of the rollers and foaming die makes it possible to produce the product in a continuous operation and utilizes the roll formers to drive the metal strip through the foaming die, thus saving double handling of the formed metal between the rolling operation and the filling operation. It is understood that the die elements 41, 42, 43 and 44 can be removed from the foaming die and replaced by other die elements shaped to receive other shapes of rolled sheet. The wide latitude in shape of the finished product is available and the metal thickness can be varied as required. Because of the insulating polyurethane foam, the structure is much more resistant to vibration and will not cause burns from cold walls or hot walls. Various automatic controls can be utilized to control the flow through the nozzle 50 to fill up the interior of the rolled strip and, of course, flow through the nozzle would be stopped by these controls if no rolled metal skin was passing through die 40. Various other modifications are contemplated by those skilled in the art without departing from the spirit and scope of the invention as hereinafter defined by the appended claims.

What is claimed is:

1. Apparatus for producing an architectural product comprising means for continuously roll forming a strip of thin metal into an architectural shape with a confined space therein, and foaming die means receiving said formed strip from said forming means, said die means comprising a nozzle means spaced from the discharge end of said die means and extending into said space for continually injecting foamable material into said space to at least partially fill the space with foamed material.

2. Apparatus for producing an architectural product comprising means for continuously roll forming a strip of thin metal into an architectural shape of substantially closed configuration with an internal space, foaming die means receiving said formed strip from said forming means, said die means comprising a die structure having inlet and discharge ends and an internal opening in the shape of said roll formed strip to support the strip during movement through said structure, and nozzle means spaced from said discharge end and extending into said internal opening for continually ejecting foamable material into said space to at least partially fill said space with foamed polyurethane prior to said strip leaving said die structure.

3. An apparatus as defined in claim 2, wherein said roll formed shape includes a continuous slot in one portion thereof, said nozzle means extending into said internal opening through said slot.

4. An apparatus as defined in claim 2, wherein said roll forming means comprises a plurality of roller sets for progressively forming said strip, said die means being located closely adjacent the last of said roller sets to prevent deformation of said strip while being driven by said last roller set through said foaming die means.

5. Apparatus for producing a structural product comprising:
    means for continuously roll forming a strip of metal into a substantially closed member having an internal space, the side edges of the strip defining an open slot in said member communicating with said internal space;
    foaming die means having a die cavity of substantially the same cross-sectional shape as said member for receiving said member from said forming means;
    a nozzle extending into said die cavity at a location intermediate the ends of said die means, said slot having a width transverse of said die cavity to snugly receive said nozzle; and
    means for connecting said nozzle with a source of foamable material in order to continually eject said material into said space to at least partially fill said space with foamed material as said member moves through said die means.

6. An apparatus as defined in claim 5 wherein said die means has a length which provides for complete foaming of said material with said space before the material leaves the die means.

7. An apparatus as defined in claim 5 having shaping means extending from said nozzle to the end of said forming die cavity to shape the foamed material within said space and substantially sealing the portion of said space located within said cavity at any time.

8. An apparatus as defined in claim 7 wherein said shaping means has the same shape transverse of said cavity as said nozzle, said foamed material being recessed way from said slot by said nozzle and said shaping means.

9. An apparatus as defined in claim 5 having means extending from said nozzle to close the portion of said slot within said die means at any given time.

References Cited by the Examiner

UNITED STATES PATENTS

| | | | |
|---|---|---|---|
| 1,640,859 | 8/27 | Stoody | 29—33.51 |
| 1,702,304 | 2/29 | Kotchi | 29—33.51 |
| 1,838,349 | 12/31 | Young | 189—34 |
| 2,125,807 | 8/38 | Petty | 189—9 |
| 2,818,638 | 1/58 | Seck | 29—527 |
| 2,898,626 | 8/59 | Alderfer. | |
| 2,910,730 | 11/59 | Risch | 29—527 X |
| 2,912,751 | 11/59 | Turnbull | 29—527 |

FOREIGN PATENTS 831,314  2/52  Germany.

RICHARD H. EANES, Jr., *Primary Examiner.*

THOMAS E. BEALL, WILLIAM W. DYER, Jr., *Examiners.*